UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS FOR THE PRODUCTION OF CAOUTCHOUC SUBSTANCES.

1,113,630. Specification of Letters Patent. Patented Oct. 13, 1914.

No Drawing. Application filed October 3, 1911. Serial No. 652,641.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in Processes for the Production of Caoutchouc Substances, of which the following is a specification.

We have discovered, that there are a number of oxygen containing organic substances, such as starch, urea, albumen (yolk or white of egg), blood serum, glycerin or other compounds of a similar action, which against all expectation favorably influence the polymerization of butadiene hydrocarbons such as butadiene, etc., and which are to be considered as equivalents for purposes of the present invention, caoutchouc substances being in this manner obtainable even at ordinary temperature and the present invention relates to their manufacture and production by treating butadiene having the formula:

$$\begin{array}{c} CH_2 \\ \| \\ CH \\ | \\ CH \\ \| \\ CH_2 \end{array}$$

or its homologues or its substitution products (butadiene substituted by other hydrocarbon residues) with organic substances like starch, urea, albumen (yolk or white of egg), blood serum, glycerin or other compounds of a similar action, which organic compounds are to be considered as equivalents for purposes of the present invention.

In order to illustrate the new process more fully the following example is given, the parts being by weight:—100 parts of beta-gamma-dimethylbutadiene are mixed with 1-2 parts of wheat starch and the mixture is allowed to stand for some months in a closed vessel. A whitish solid caoutchouc substance is thus obtained. A whitish elastic caoutchouc substance can be obtained by treating in the same way a mixture of 500 parts of isoprene with 5-10 parts of finely powdered urea.

Alpha-methyl-butadiene, butadiene, alpha-alpha-dimethyl-, beta-propyl-, beta-isobutyl-butadiene or the butadiene derivative of the formula:

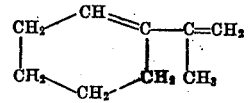

may be used.

The claims of the present application relate to the process of polymerization using urea or its equivalents. The process of production of caoutchouc substances in which nitrogenous organic substances and nitrogenous oxygen-containing organic substances are used is claimed in our copending application, Serial No. 728,511 which is in part a continuation of the present application. The process in which polyhydroxy organic substances such as starch are used is claimed in our copending application Serial No. 728,510 which is also in part a continuation of the present application.

We claim:—

1. The process of producing a caoutchouc substance which comprises polymerizing a butadiene hydrocarbon in the presence of urea.

2. The process of producing a caoutchouc substance which comprises polymerizing a butadiene hydrocarbon in the presence of about 1 to 2 per cent. of urea.

3. The process of producing a caoutchouc substance which comprises polymerizing isoprene in the presence of urea.

4. The process of producing a caoutchouc substance which comprises polymerizing isoprene in the presence of about 1 to 2 per cent. of urea.

In testimony whereof we have hereunto set our hands in the presence of two subscribing witnesses.

FRITZ HOFMANN. [L.S.]
CARL COUTELLE. [L.S.]

Witnesses:
L. NUFER,
CHAS. J. WRIGHT.